(12) United States Patent
Strom et al.

(10) Patent No.: US 11,994,421 B2
(45) Date of Patent: May 28, 2024

(54) VIBRATION RESISTANT TEMPERATURE SENSING ASSEMBLY

(71) Applicant: Rosemount Inc., Shakopee, MN (US)

(72) Inventors: Gregory R. Strom, Boulder, CO (US); Zheng Min, Beijing (CN)

(73) Assignee: Rosemount Inc., Shakopee, MN (US)

( * ) Notice: Subject to any disclaimer, the term of this patent is extended or adjusted under 35 U.S.C. 154(b) by 549 days.

(21) Appl. No.: 17/165,346

(22) Filed: Feb. 2, 2021

(65) Prior Publication Data

US 2021/0325219 A1 Oct. 21, 2021

Related U.S. Application Data

(63) Continuation of application No. PCT/CN2020/084948, filed on Apr. 15, 2020.

(51) Int. Cl.
*G01F 1/69* (2006.01)
*G01K 1/08* (2021.01)
*G01K 7/16* (2006.01)

(52) U.S. Cl.
CPC ............ *G01F 1/69* (2013.01); *G01K 1/08* (2013.01); *G01K 7/16* (2013.01)

(58) Field of Classification Search
CPC .... G01F 1/69; G01F 1/68; G01K 1/08; G01K 7/16
See application file for complete search history.

(56) References Cited

U.S. PATENT DOCUMENTS

| 5,773,726 A * | 6/1998 | Mahoney | G01F 1/46 |
| | | | 73/861.65 |
| 5,969,266 A * | 10/1999 | Mahoney | G01F 1/46 |
| | | | 73/861.65 |
| 9,702,743 B2 | 7/2017 | Strom et al. | |
| 11,067,417 B2 | 7/2021 | Strom et al. | |
| 2009/0296781 A1* | 12/2009 | Weber | G01K 7/16 |
| | | | 374/185 |
| 2014/0260658 A1 | 9/2014 | Strom et al. | |
| 2014/0260671 A1* | 9/2014 | Stehle | G01F 1/46 |
| | | | 73/861.66 |
| 2014/0269820 A1* | 9/2014 | Perrault | G01K 13/02 |
| | | | 374/54 |

(Continued)

FOREIGN PATENT DOCUMENTS

| CN | 201421377 Y | 3/2010 |
| CN | 207570693 U | 7/2018 |

(Continued)

OTHER PUBLICATIONS

International Search Report and Written Opinion for International Patent Application No. PCT/CN2020/084948, dated Jan. 20, 2021, 10 pages.

(Continued)

*Primary Examiner* — Nathaniel T Woodward
(74) *Attorney, Agent, or Firm* — Christopher R. Christenson; Kelly, Holt & Christenson, P.L.L.C.

(57) ABSTRACT

A thermal probe assembly includes an RTD element having an electrical resistance that varies with temperature. A plurality of leadwires is operably coupled to the RTD element. The RTD element is disposed within a sheath and spaced from a distal end of the sheath by a distance selected to provide vibration resistance to the RTD element.

20 Claims, 10 Drawing Sheets

(56) References Cited

U.S. PATENT DOCUMENTS

| | | | |
|---|---|---|---|
| 2015/0090050 A1* | 4/2015 | Wiklund | G01F 1/37 73/861.65 |
| 2016/0178448 A1* | 6/2016 | Mella | G01K 1/08 29/613 |
| 2018/0003655 A1 | 1/2018 | Rud et al. | |
| 2018/0188119 A1* | 7/2018 | Xiao | G01K 13/08 |
| 2020/0096409 A1* | 3/2020 | Bergquist | G01M 3/143 |

FOREIGN PATENT DOCUMENTS

| | | |
|---|---|---|
| JP | 20117588 A | 8/1988 |
| JP | 2008241599 A | 10/2008 |
| JP | 2009192310 A | 8/2009 |
| JP | 2015219102 A | 12/2015 |
| KR | 2011075844 A | 6/2011 |

OTHER PUBLICATIONS

Supplementary European Search Report for European Application No. 20931227.1, Dated Nov. 24, 2023, 9 pages.
Office Action for Japanese Application No. 2022-562686, dated Jan. 5, 2024, 5 pages including English Translation.

* cited by examiner

VIBRATION RESISTANT TEMPERATURE SENSING ASSEMBLY

CROSS-REFERENCE TO RELATED APPLICATION

This Application is a continuation application filed under 35 U.S.C. 111(a) and claims benefit of International Application No. PCT/CN2020/084948, filed Apr. 15, 2020, the contents of which are hereby incorporated by reference in their entirety.

BACKGROUND

The process industry employs process variable transmitters to monitor process variables associated with substances such as solids, slurries, liquids, vapors, and gases in chemical, pulp, petroleum, pharmaceutical, food and other fluid process plants. Process variables includes pressure, temperature, flow, level, turbidity, density, concentration, chemical composition, and other properties.

Temperature sensors are used in a wide array of process variable transmitters to provide an indication of temperature related to a process fluid. While there are many types of temperature sensors, resistance thermal devices (RTDs) are commonly used where enhanced measurement accuracy and precision are required. RTDs usually employ either a winding of temperature sensitive wire about a center support or a patterned circuit of temperature-sensitive metal deposited or otherwise placed on a non-conductive substrate, such as ceramic. The temperature sensitive metal can be any metal that has a conductivity that changes with temperature. Suitable examples include nickel and platinum. RTD's can be made in a variety of sizes, but costs generally increase as the RTD becomes larger. Thus, small RTDs provide important advantages of high measurement accuracy and precision as well as lower cost.

While RTDs are used in a variety of applications, one particular application is a thermal probe. In a thermal probe, an RTD is placed within a sheath or conduit that protects the RTD from impacts and direct contact with the medium. In some installations, the thermal probe is then inserted into a larger sensing structure, such as a thermowell or flow sensor. These devices are typically exposed to process fluid flow and experience elevated temperatures and vibration. In a thermowell, the end of the sheath of the thermal probe contacts a bottom surface of the thermowell. This is advantageous in that it not only ensures effective thermal contact, but it also helps mechanically anchor the sheath inside the thermowell, which provides vibration resistance.

SUMMARY

A thermal probe assembly includes an RTD element having an electrical resistance that varies with temperature. A plurality of leadwires is operably coupled to the RTD element. The RTD element is disposed within a sheath and spaced from a distal end of the sheath by a distance selected to provide vibration resistance to the RTD element.

BRIEF DESCRIPTION OF THE DRAWINGS

FIGS. 10A-1 and 10A-2 are diagrammatic views of a spring assembly that can be applied to an external diameter of an RTD probe assembly in accordance with another embodiment of the present invention.

FIGS. 10B-1 and 10B-2 are diagrammatic view of another embodiment of a structure that can be applied to an RTD probe assembly in accordance with another embodiment of the present invention.

DETAILED DESCRIPTION OF ILLUSTRATIVE EMBODIMENTS

RTD assemblies are used in a variety of applications. Such applications include utilization in thermowells in order to measure a temperature of a process fluid or other substance flowing in a process conduit or disposed in a storage container or tank. Another common application for RTD probe assemblies is in process fluid flow measurement. Temperature measurement of process fluid during process fluid flow measurement is important in that fluid properties can be influenced by process fluid temperature. One example of a process fluid flow measurement system that also senses process fluid temperature is sold under the trade designation Rosemount 3051SFA-Annubar Flow meter. With the Annubar Flow meter, an RTD element is typically positioned to be approximately disposed in the center of a process fluid conduit in which the Annubar primary element extends. Generally, RTDs are specified in Annubar primary elements to position the RTD element in the middle third of the pipe internal diameter with the distal end unsupported. As can be appreciated, the Annubar flow element undergoes vibration as process fluid flows by it. In some instances, the vibration experienced by the RTD element within the flow primary element can damage or even destroy the RTD element.

Embodiments of the present invention generally arise from careful study of the problem of vibration on RTD elements, and while the embodiments are particularly applicable to RTD assemblies located in process fluid flow installations, embodiments of the present invention are applicable to any installation or application in which an RTD probe assembly undergoes vibration.

Figure 1:
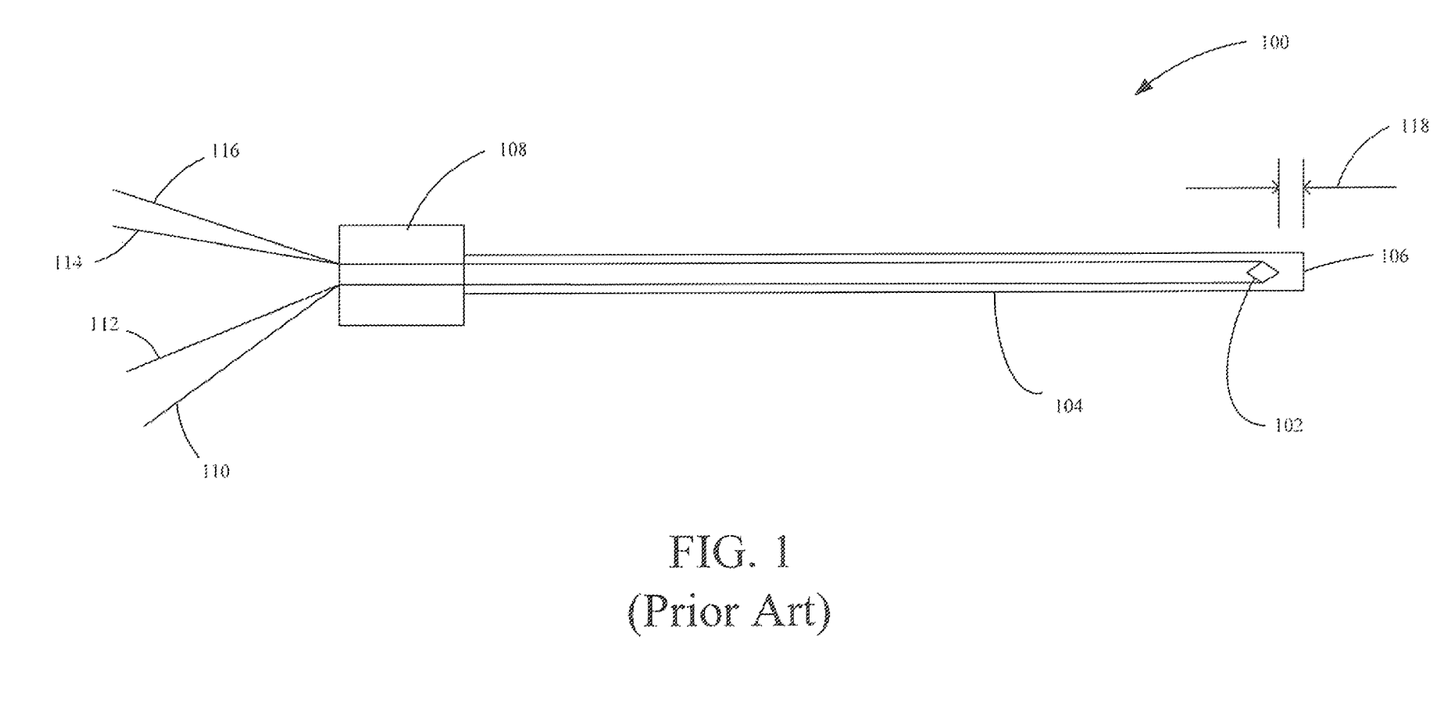
FIG. 1 is a diagrammatic cross-sectional view of a known RTD probe assembly.

FIG. 1 is a diagrammatic cross-sectional view of an RTD probe assembly. RTD probe assembly 100 includes RTD element 102 located within protective sheath 104 near a distal end 106 of sheath 104. Sheath 104 is mechanically coupled to mount 108 which, in some instances, is threaded such that it can be threadably attached to other structures, such as a thermowell. A plurality of conductors 110, 112, 114, and 116 is electrically coupled to RTD element 102 to allow external connections to RTD element 102.

RTD element 102 is formed by a winding or circuit of material, such as metal, having an electrical conductivity that changes with temperature. Examples of such metals include platinum and nickel. As shown in FIG. 1, RTD assembly 100 has four lead wires 110, 112, 114, and 116. This allows RTD element 102 to be measured with a highly precise 4-wire measurement technique. However, embodiments can be practiced with less than four wires if such precision is not required. RTD element 102 is illustrated being positioned in very close proximity to distal end 106 of sheath 104. Typically, in thermowells especially, the RTD element is intended to measure the temperature of a distal end of a thermowell. To the extent that material exists between the RTD element and the end of the sheath and/or thermowell, such additional material will generate additional time for the heat to flow through the intervening structures in order to be measurable by the RTD element. Thus, distance 118 is typically minimized in order to reduce the time constant of the thermal system.

Figure 2A:
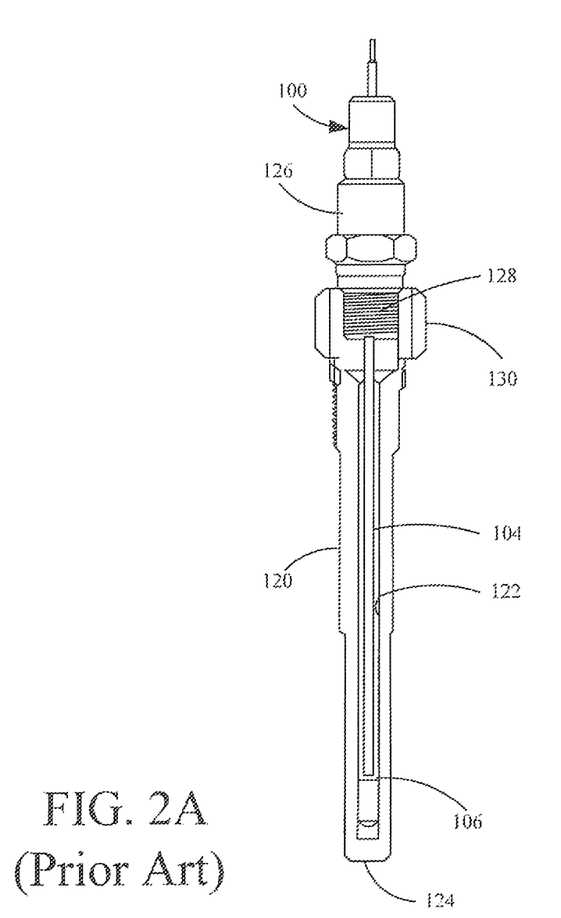
FIGS. 2A and 2B are cross-sectional and perspective exploded views, respectively, of a standard RTD probe assembly integrated into a thermowell.

FIG. 2A is a diagrammatic cross-sectional view of RTD probe assembly 100 mounted within a thermowell 120. As shown, sheath 104 is inserted within bore 122 of thermowell 120. Further, distal end 106 is located near distal end 124 of thermowell 120. A threaded adapter 126 threadably receives RTD probe assembly 100 and then includes external threads 128 that are threadably received within mounting portion 130 of thermowell 120. This forms a highly robust structure that allows RTD probe assembly 100 to be thermally exposed to a process fluid or other material while still mechanically and chemically protecting the RTD probe assembly 100 from such exposure.

Figure 2B:
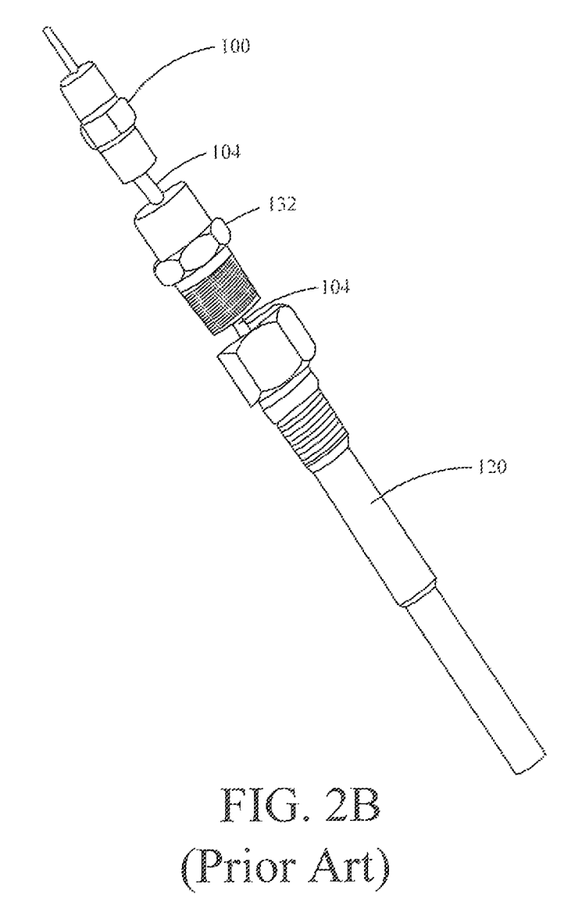

FIG. 2B is an exploded view of the same assembly shown in FIG. 2A. As can be seen, sheath 104 passes through threaded mount 132.

Figure 3A:
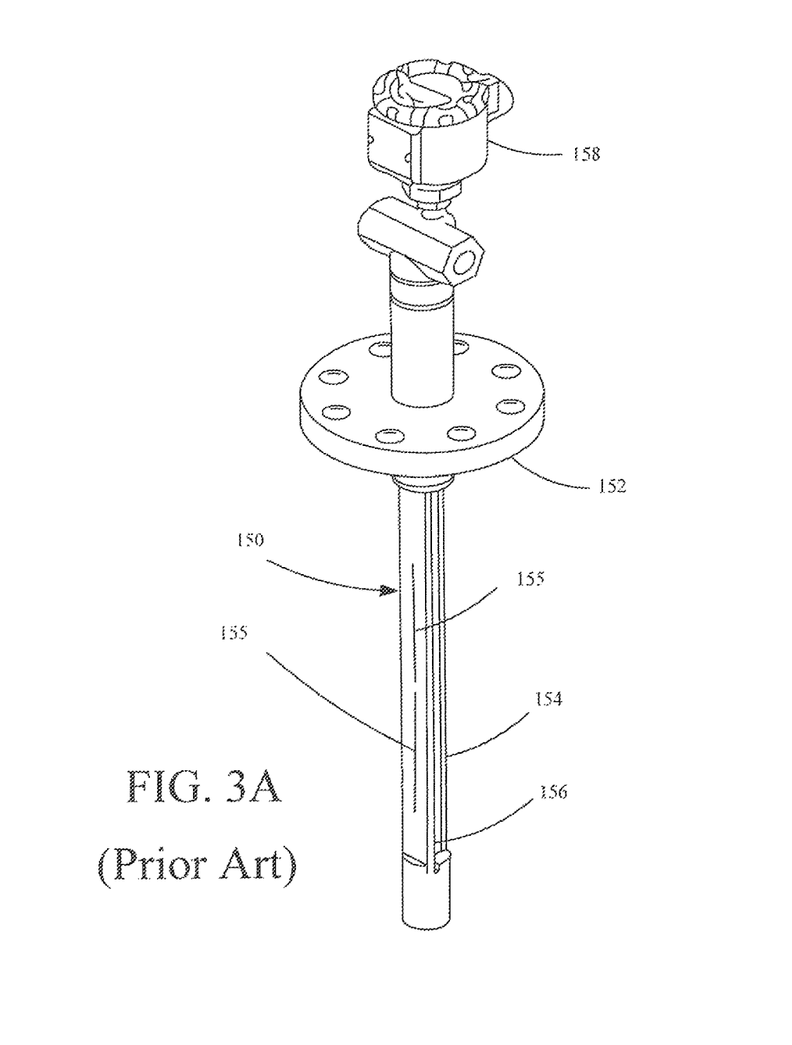
FIGS. 3A and 3B are perspective and exploded views, respectively, of a standard RTD probe assembly integrated into a flow measurement device.

FIG. 3A is a diagrammatic view of an RTD assembly integrated into a process fluid flow measurement system. The process fluid flow measurement system includes a primary element 150 having a mounting flange 152 and flow measurement probe 154. Mounting flange 152 is configured to mount primary element 150 to a process fluid flow conduit via a standard pipe flange, or the like. Measurement probe 154 extends into the process fluid flow conduit and includes apertures 155 that provide an averaging pitot tube that delivers superior measurement accuracy over a wide flow range. When flow measurement probe 154 is disposed within a process flow, edges 156 of measurement probe 154 can generate Von Karman vortices that induce vibration in the flow measurement probe. An RTD assembly 100 (shown in FIG. 3B) is provided within flow measurement probe 154 to allow transmitter 158 to provide an indication of process fluid temperature.

Figure 3B:
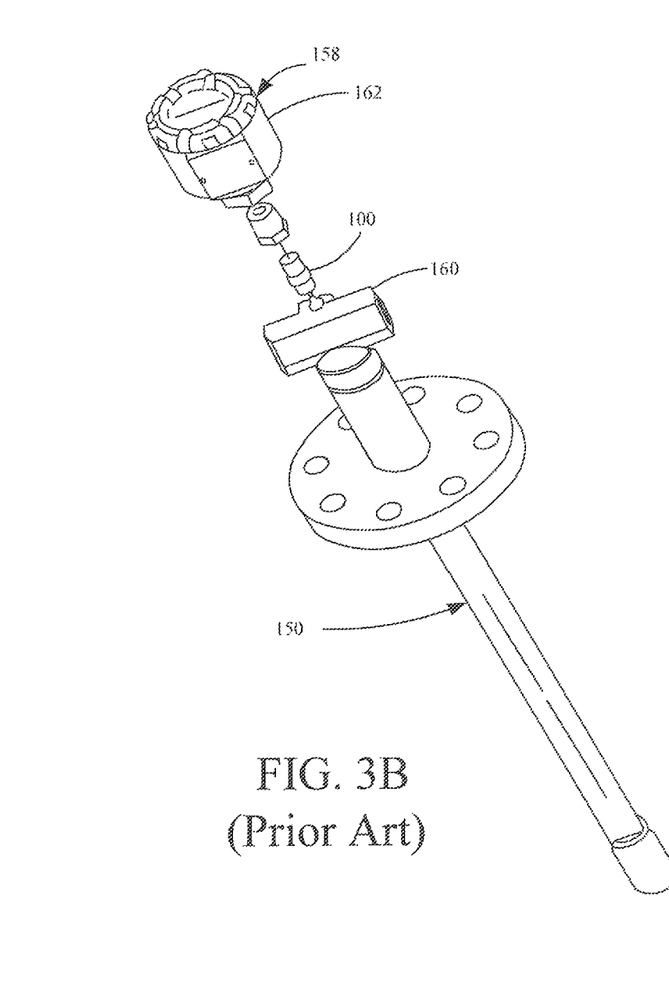

FIG. 3B shows a standard RTD 100 disposed within thermal probe port 160 of flow measurement element 150. Conductors of the RTD assembly are coupled to electronics or a terminal block within housing 162 that generally are configured to measure a resistance of the RTD element and provide an indication of process fluid temperature.

Figure 4A:
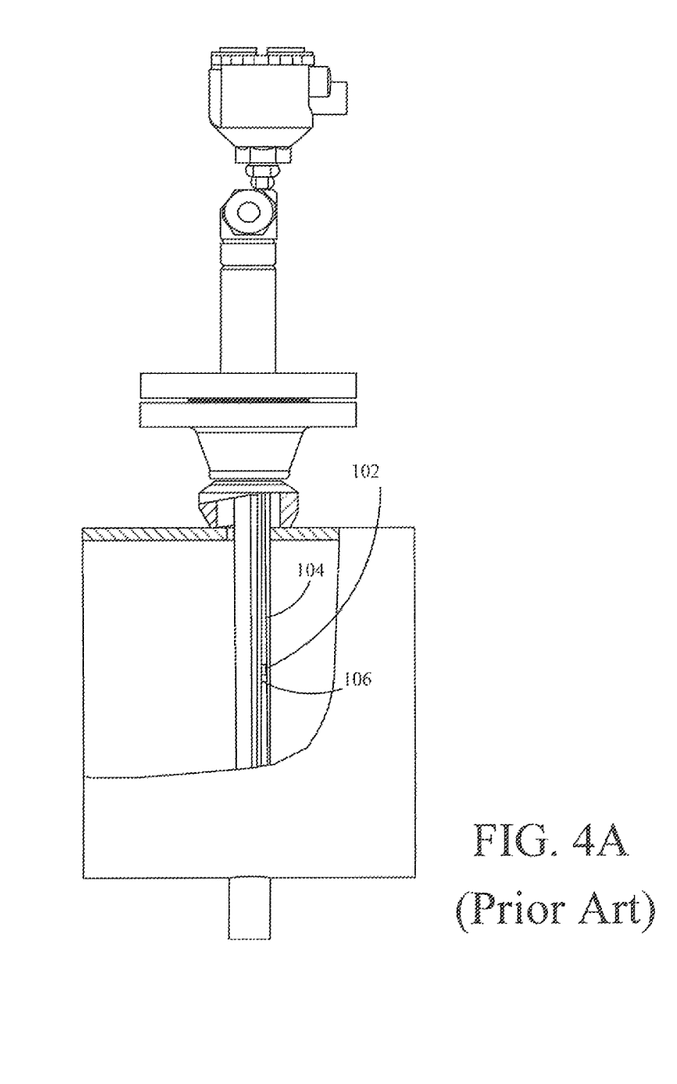
FIGS. 4A and 4B are diagrammatic cross-sectional views of an RTD probe assembly in a flow measurement application in accordance with the prior art (FIG. 4A) and in accordance with an embodiment of the present invention (FIG. 4B).
Figure 4B:
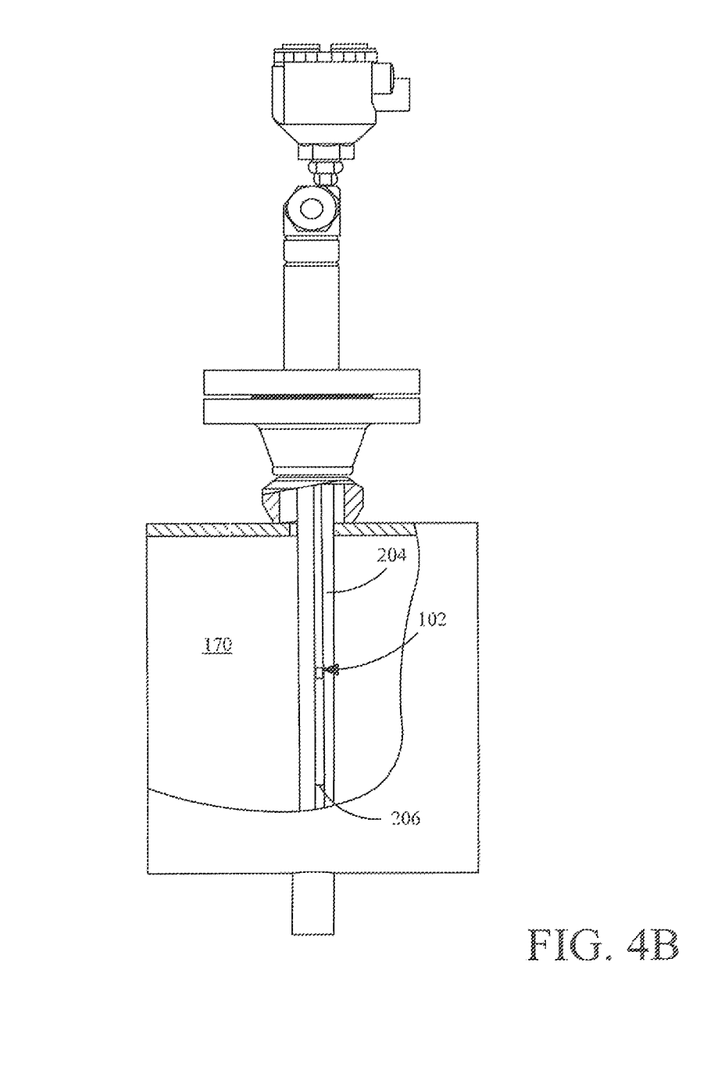

FIGS. 4A and 4B contrast known RTD probe designs with RTD probe designs in accordance with embodiments of the present invention. As shown in FIG. 4A, a known design has an RTD element 102 disposed proximate an end 106 of sheath 104. It has been found that when the RTD element is located at or near the end of the sheath, that it is more susceptible to damage or destruction by vibration. Accordingly, as shown in FIG. 4B, while the RTD element 102 is still located at generally the same axial position within flow conduit 170, the end 206 of sheath 204 is spaced from RTD element 102. In this way, vibrations present along sheath 204 are spaced, relative to their wavelengths, from the position of element 102. The amount of sheath extension can vary in accordance with various embodiments of the present invention. The sheath extension can be provided as a function of diameter of the sheath. For example, the extension can be specified to be at least 3 diameters in distance. And a preferred distance can be 6 diameters in distance. In other embodiments, the sheath extension can be selected based on the natural frequency of the structure in which the thermal probe will be used. For example, a primary flow element having a resonance frequency of 300 Hz may require an extension of 1.5". Finally, the sheath extension can simply be provided as a distance from the RTD element. In one embodiment this distance is greater than 0.5". In a preferred embodiment, the sheath extension is about 1.5".

Figure 5A:
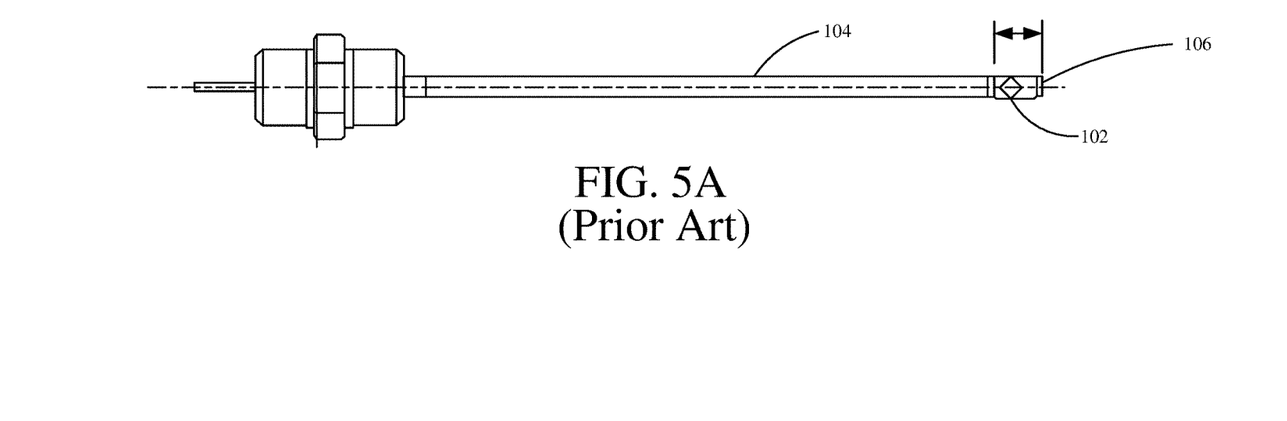
FIGS. 5A and 5B contrast a known RTD probe design (FIG. 5A) with an RTD probe design in accordance with an embodiment of the present invention (FIG. 5B).
Figure 5B:
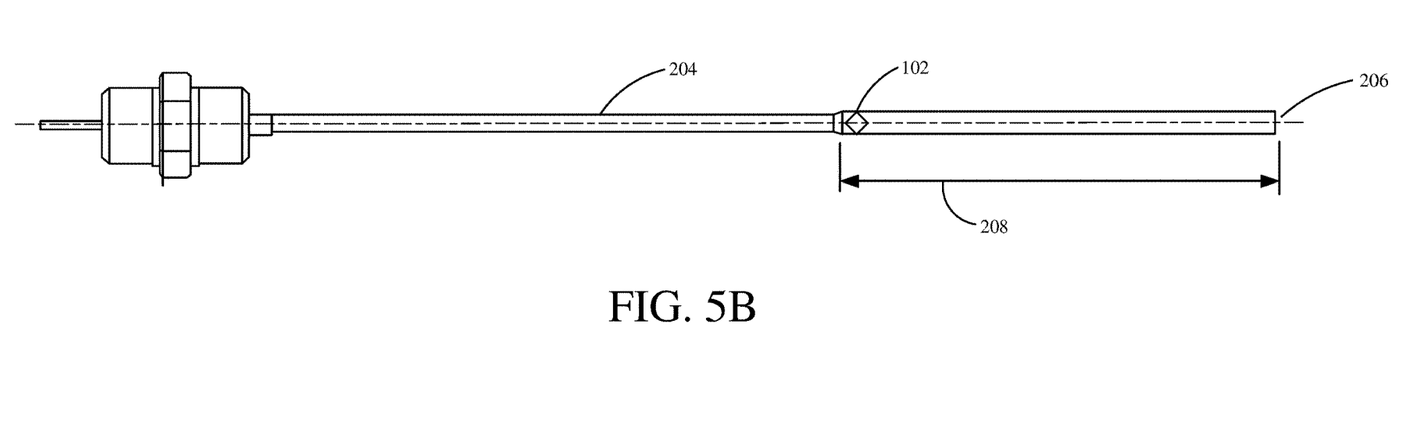

FIGS. 5A and 5B contrast known RTD probe assembly designs (FIG. 5A) with RTD assemblies in accordance with embodiments described herein (FIG. 5B). As shown in FIG. 5A, an RTD sensor element 102 is generally disposed within about a half inch (12.7 mm) of end 106 of sheath 104. In distinct contrast, as shown in FIG. 5B, element 102 is spaced significantly from end 206 of sheath 204. This extended length of sheath 204 is illustrated at reference numeral 208. This embodiment generally runs counter to the normal design of RTD probes in which the sensing element is placed as close as possible to the distal end in order to ensure a reduced time constant of the RTD assembly. This relatively straightforward, but counterintuitive, change was facilitated by a detailed understanding of different vibrational modes of RTD probe assemblies.

Figure 6:
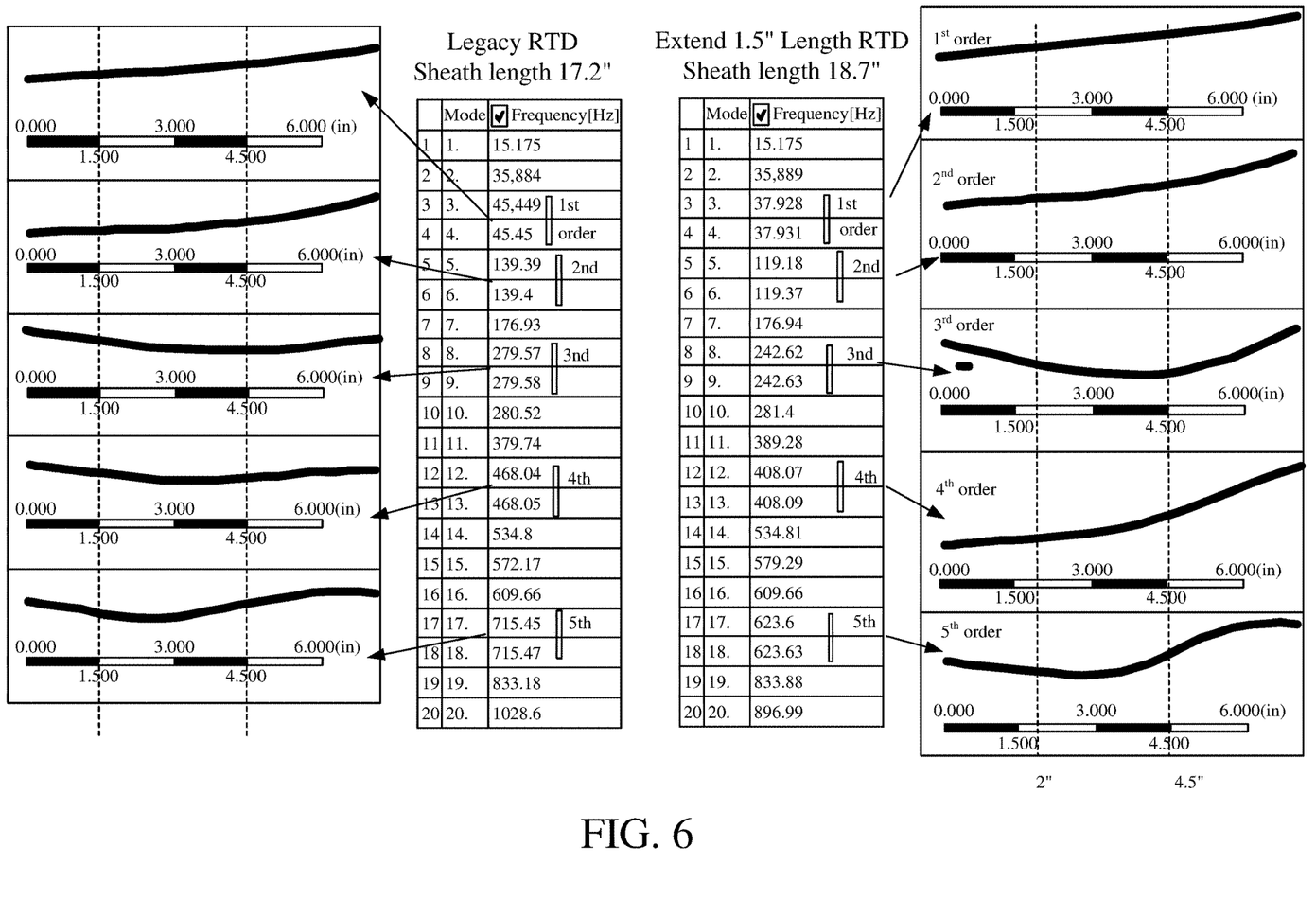
FIG. 6 is a vibration analysis of a legacy RTD probe assembly versus vibration analysis of an extended-length RTD with an accordance with an embodiment of the present invention.
Figure 7:
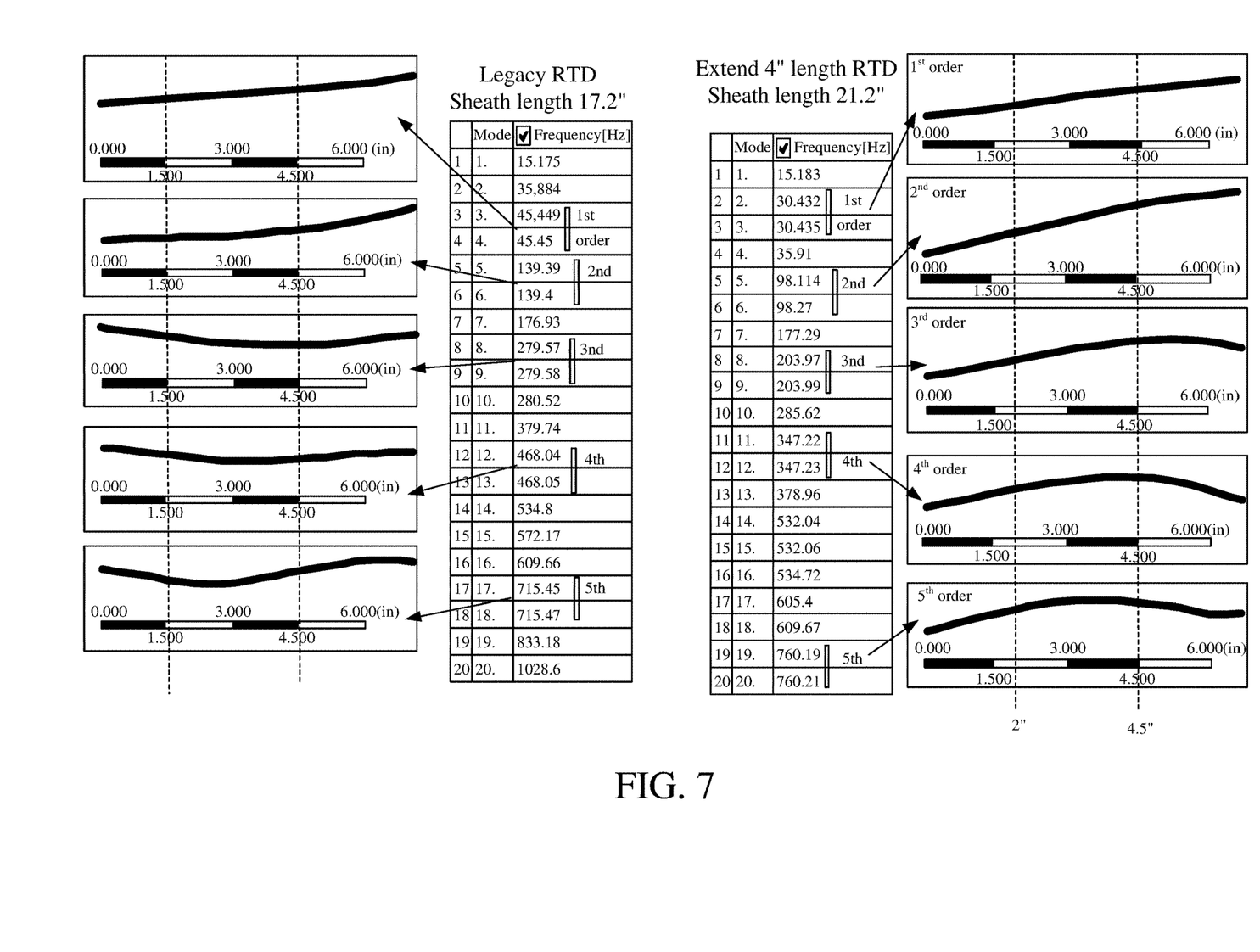
FIG. 7 is a vibration analysis of a legacy RTD probe assembly with a sheath length of 17.2 inches in comparison to vibration analysis of an RTD probe assembly having an extended sheath length in accordance with an embodiment of the present invention.
Figure 8:
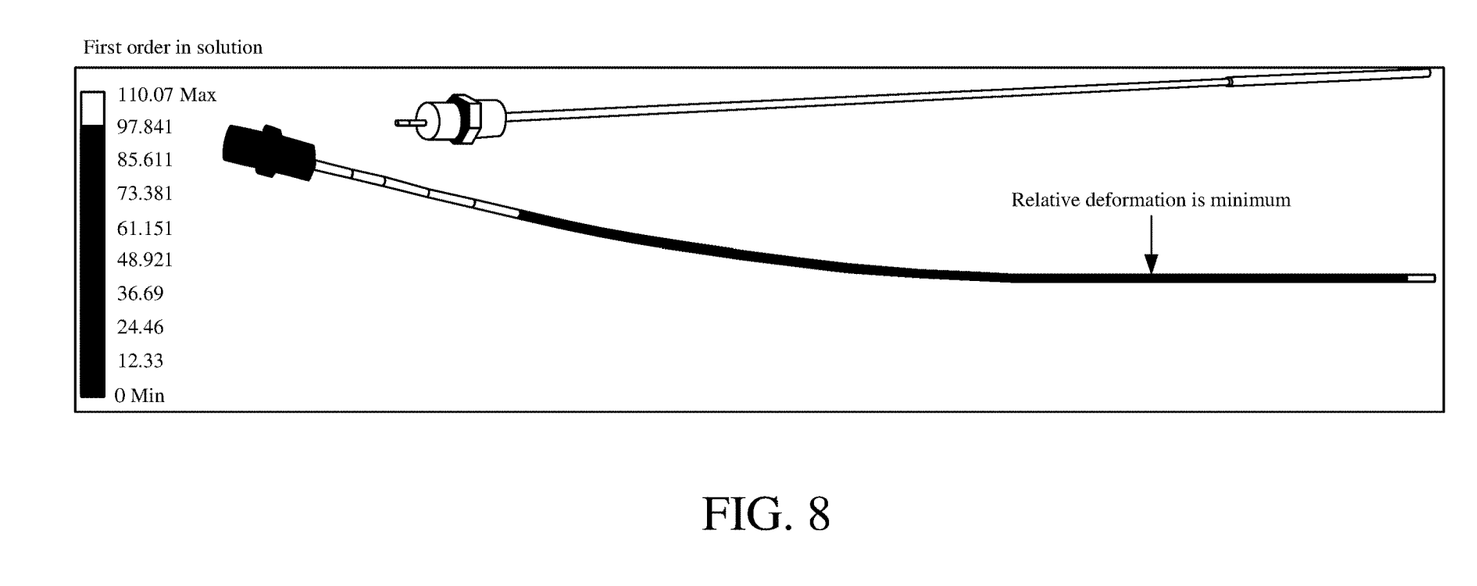
FIG. 8 is a diagrammatic view of an RTD probe assembly illustrating a location of relative deformation minimum.

FIG. 6 is a diagrammatic view of vibration analysis of a known RTD probe assembly with a length of 17.2" in comparison to an extended-length RTD probe assembly in accordance with an embodiment of the present invention with a length of 18.7". In each case, various orders of harmonic vibrations are shown with respect to each design. Improved anti-vibration performance is achieved by extending sheath length to ensure that the RTD element is positioned at a location of minimum deformation when the RTD is vibrating at a resonance frequency. ANSYS was used to simulate RTD sheath deformation with an RTD NPT side fixed. First order relative deformation trends of the sheath are shown in FIGS. 6 and 7. From first order to fifth order relative deformation trends, minimum deformation is from 1 inch to 5 inch locations. The higher the frequency, the closer the related deformation location is to the sheath end. When frequency is over 200 Hz, minimum related deformations emerge at approximately 1.5 inches from the tip of the RTD assembly.

FIG. 7 is a diagrammatic view of vibration analysis of a legacy RTD probe assembly (RTD sheath length 17.2") in comparison to an extended length RTD probe assembly in accordance with an embodiment of the present invention (RTD sheath length 21.2").

Figure 9:
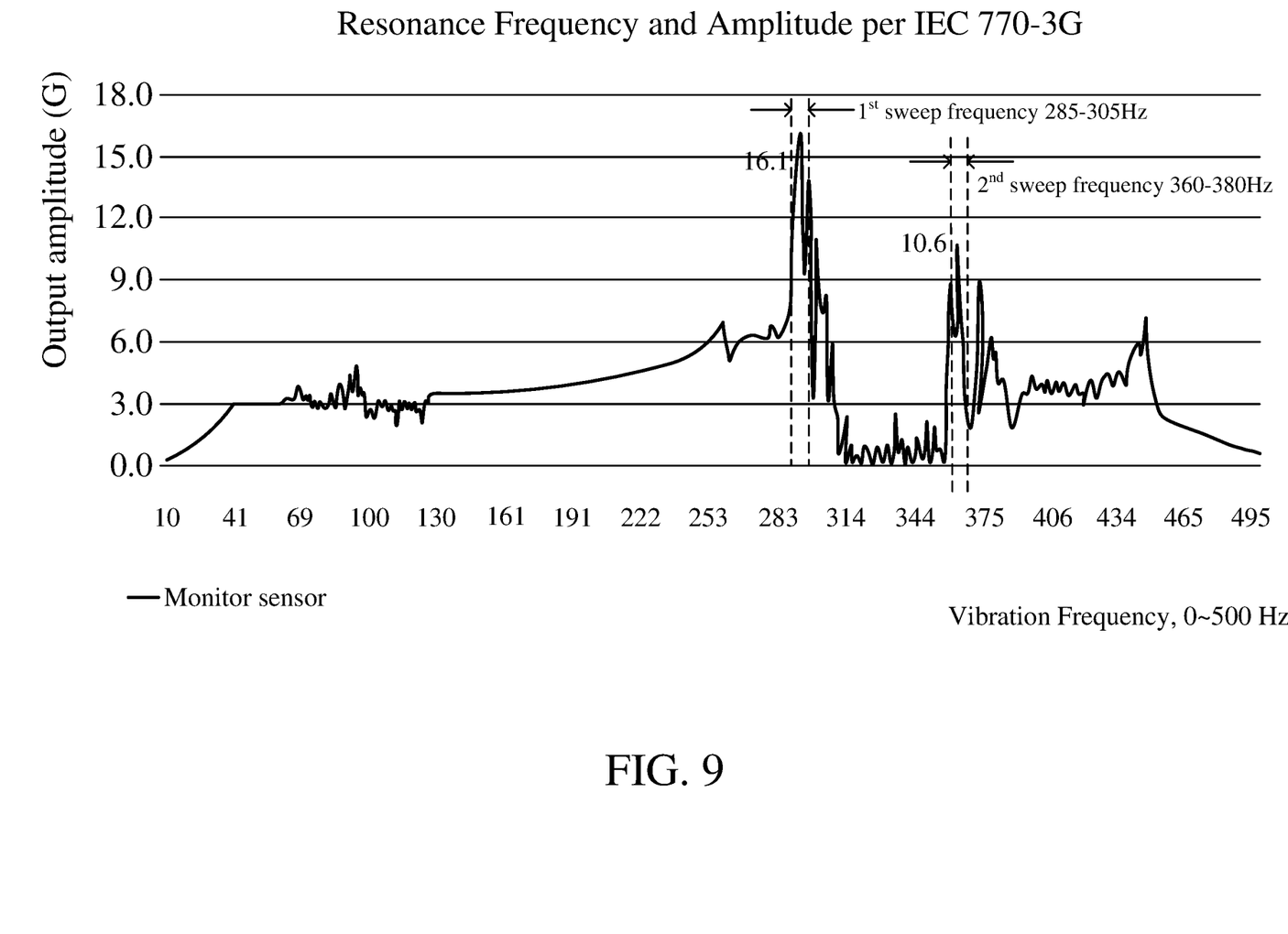
FIG. 9 is a chart of output amplitude versus vibration frequency illustrating vibration analysis.

Based on the simulation results, various prototypes were fabricated with different extension lengths. For example, legacy RTD assemblies were provided with 1.5 inch extended sheath ends, and additional prototypes were provided with 4 inch extended sheath ends for an IEC-7700 vibration test. An initial resonance search was set from 10-500 Hz, with the frequency sweeping as shown in FIG. 9. Two peaks emerged at approximately 294 Hz and 364 Hz. Endurance condition sweep frequency was set to 285-305 Hz with 40 hours endurance time and all RTDs were reading normal after a first run vibration test. The endurance sweep frequency was then changed to 360-380 Hz and some failures began to emerge. The legacy RTD (no extension) failed the quickest, and the longest extension (4 inches) failed next. However, the 1.5 inch extension prototypes did not fail in the endurance testing. The vibration test results indicated that any sheath extension is better than no sheath extension, but that a particular sheath extension based on the wavelength of the resonance frequency can yield the best results. Accordingly, it is believed that embodiments of the present invention can improve vibration resistance of RTD probe assemblies without changing the sensor element location but only increasing the RTD sheath length in order to provide a minimum or reduced deformation location at the RTD element location. This improvement can be provided with relatively little additional change to the fabrication of the RTD probe assembly and minimal increased cost. While embodiments of the present invention are particularly useful for averaging pitot tube differential pressure primary elements, such as that shown in FIG. 3, embodiments of the present invention are useful with any RTD probe assembly that is exposed to any vibration.

While embodiments described herein generally improve an RTD assembly for vibration resistance by extending the sheath of the RTD assembly, it is also been found that additional improvements can be provided by placing a biasing element around an external diameter of the sheath. This can help reduce the degree to which the sheath rattles or otherwise vibrates inside a thermowell or other measurement assembly.

Figure 10A:
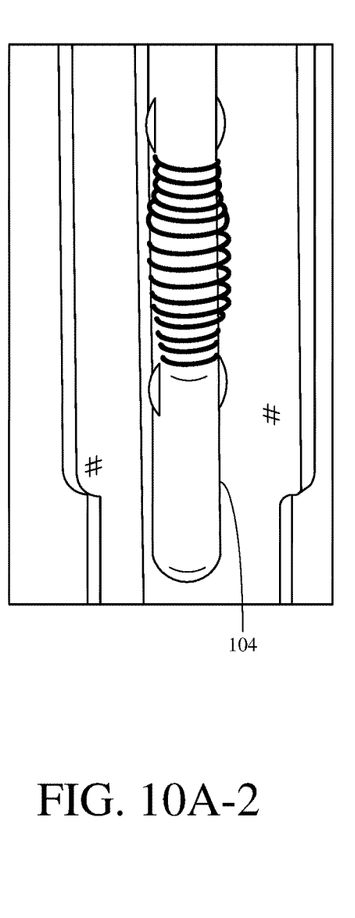
Figure 10A:
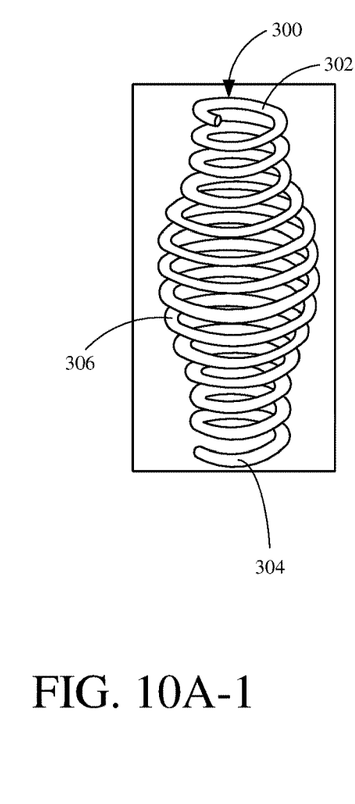

FIG. 10A-1 is a perspective view of a profiled spring that can be applied to an external diameter of an RTD sheath in accordance with an embodiment of the present invention. Spring 300 has a profile such that ends 302, 304 have a relatively smaller diameter in order to be affixed to or otherwise biased onto an external diameter of an RTD sheath 104 (shown in FIG. 10A-2). Additionally, spring 300 is profiled such that it includes a larger diameter portion 306 that is configured to engage an internal diameter, such as internal diameter 122 (shown in FIG. 2A) of a thermowell or other measurement structure. In this way, spring 300 helps to reduce the degree to which sheath 104 may rattle or otherwise vibrate within a measurement structure.

Figure 10B:
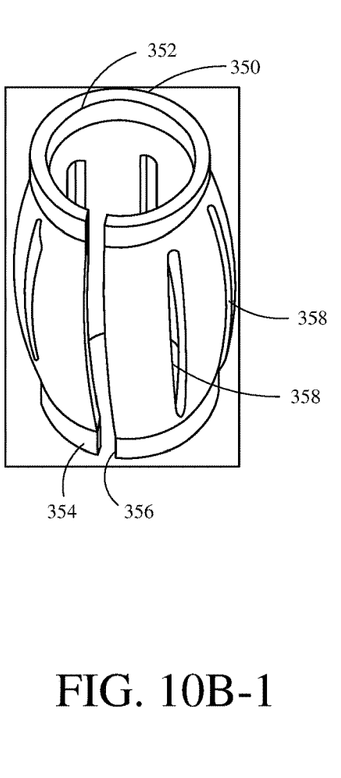
Figure 10B:
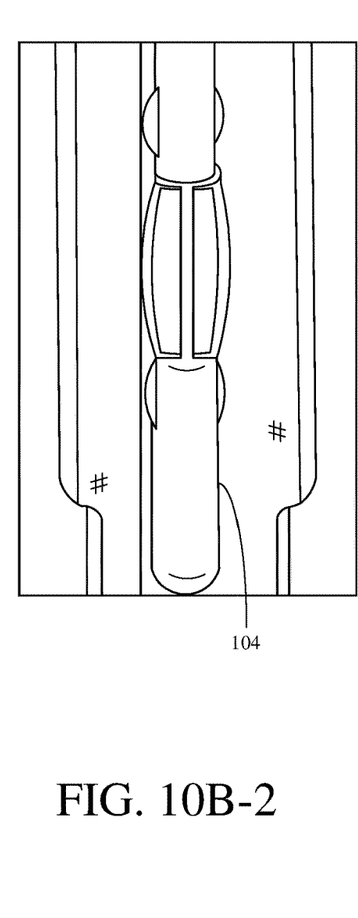

In accordance with another embodiment of the present invention, other suitable elements can be applied to an external diameter of sheath 104 in order to reduce the degree to which it is allowed to move within a measurement structure. As shown in FIG. 10B-1, spring barrel 350 includes openings 352, 354 that are sized to fit around an external diameter of sheath 104. Moreover, a slot 356 allows spring barrel 350 to deform in order to allow ends 352, 354 to fit around external diameter 104. Additionally, spring barrel 350 is shown with longitudinal slats 358 that bow outwardly in order to engage an internal surface, such as diameter 122 of a thermowell or other suitable measurement structure. In this way, spring barrel 350 can function similarly to spring 300 (shown in FIGS. 10A-1 and 10A-2) to reduce the degree to which an RTD sheath may move within a thermowell or measurement structure. Spring 300 or spring barrel 350 can be fixed to the sheath by clamping or other means to mitigate relative movement between RTD element 105 and the thermowell.

Although the present invention has been described with reference to preferred embodiments, workers skilled in the art will recognize that changes may be made in form and detail without departing from the spirit and scope of the invention.

What is claimed is:

1. A thermal probe assembly comprising:
   an RTD element having an electrical resistance that varies with temperature;
   a plurality of leadwires operably coupled to the RTD element;
   a sheath having a sheath diameter and an internal distal end; and
   wherein the RTD element is disposed within the sheath and spaced from the internal distal end of the sheath by a distance of at least three times the sheath diameter.

2. The thermal probe assembly of claim 1, wherein the RTD element is spaced from the internal distal end of the sheath by about 1.5 inches.

3. The thermal probe assembly of claim 1, wherein the RTD element is spaced from the internal distal end of the sheath by more than 1.5 inches.

4. The thermal probe assembly of claim 3, wherein the RTD element is spaced from the internal distal end of the sheath by about 4.0 inches.

5. A field device comprising:
   a thermal probe assembly including:
      an RTD element having an electrical resistance that varies with temperature;
      a plurality of leadwires operably coupled to the RTD element;
      a sheath;
      wherein the RTD element is disposed within the sheath and spaced from a distal end; and
   a process element configured for insertion into a process fluid, the process element having a bore configured to receive the thermal probe assembly, the process element having a natural vibration frequency; and
   wherein the RTD element is spaced from the distal end of the sheath by a distance that positions the RTD element within the process element at a location of reduced vibrational amplitude at the natural vibration frequency.

6. The field device of claim 5, wherein the process element is a thermowell.

7. The field device of claim 5, wherein the process element is a primary flow element.

8. The field device of claim 7, wherein the RTD element is spaced from the distal end of the sheath by about 1.5".

9. The field device of claim 8, wherein the primary process element generates von Karman vortices in the process fluid.

10. The field device of claim 5, wherein the RTD element is spaced from the distal end of the sheath by a distance that positions the RTD element within the process element at a location of minimum vibrational amplitude at the natural vibration frequency.

11. The field device of claim 5, wherein the RTD element is spaced from the distal end of the sheath by a distance that positions the RTD element within the process element at a location of reduced vibrational amplitude at a harmonic of the natural vibration frequency.

12. The field device of claim 5, and further comprising a mechanical spacer position about the sheath and configured to bias the sheath away from an internal diameter of the bore.

13. The field device of claim 12, wherein the mechanical spacer is a profiled spring.

14. The field device of claim 13, wherein the profiled spring has a pair of ends with diameters that are configured to engage an outer diameter of the sheath, the profiled spring having a middle portion configured to engage an inner diameter of the bore.

15. The field device of claim 12, wherein the mechanical spacer is a spring barrel having a plurality of longitudinal slats.

16. The field device of claim 15, wherein the spring barrel includes a longitudinal slot extending from a first end to a second end.

17. A method of measuring temperature of a process fluid in a vibrational environment, the method comprising:

providing an RTD element having an electrical resistance that varies with temperature;

positioning the RTD element within a sheath, the sheath having an internal distal end;

providing a primary element within the process fluid, the primary element having a resonant frequency;

spacing the RTD element within the sheath away from the internal distal end by a distance selected to position the RTD element at a reduced vibrational amplitude position at the resonant frequency.

18. The method of claim 17, wherein spacing the RTD element from the distal end is performed by mounting a sheath extension to the sheath.

19. The method of claim 17, and further comprising using the measured process fluid temperature to provide a process fluid flow measurement.

20. The method of claim 17, and further comprising providing an indication of process fluid temperature.

\* \* \* \* \*